(12) United States Patent
Glenn et al.

(10) Patent No.: US 12,513,056 B2
(45) Date of Patent: Dec. 30, 2025

(54) MACHINE LEARNING (ML)-BASED TECHNIQUES FOR ADJUSTING NETWORK SERVICE PARAMETERS FOR SUBSCRIBERS OF A WIRELESS TELECOMMUNICATION NETWORK

(71) Applicant: T-Mobile USA, Inc., Bellevue, WA (US)

(72) Inventors: Peter Jonathan Glenn, Bonney Lake, WA (US); Rohit Iyer, Renton, WA (US); Santosh Ashok Javali, Marysville, WA (US); Sean Harrison Roach, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 402 days.

(21) Appl. No.: 18/312,899

(22) Filed: May 5, 2023

(65) Prior Publication Data
US 2024/0372788 A1 Nov. 7, 2024

(51) Int. Cl.
*H04L 12/00* (2006.01)
*H04L 41/0823* (2022.01)
*H04L 41/16* (2022.01)

(52) U.S. Cl.
CPC .......... *H04L 41/16* (2013.01); *H04L 41/0836* (2013.01)

(58) Field of Classification Search
CPC . H04L 41/16; H04L 41/0836; H04L 25/0224; H04W 16/18
USPC ........................................................ 370/329
See application file for complete search history.

(56) References Cited

U.S. PATENT DOCUMENTS

| | | |
|---|---|---|
| 6,353,740 B1 | 3/2002 | Granberg |
| 7,215,754 B1 | 5/2007 | Woodson et al. |
| 7,333,810 B2 | 2/2008 | Preiss et al. |
| 9,398,491 B2 | 7/2016 | Schwarz |
| 10,091,658 B2 | 10/2018 | Zhang et al. |
| 10,680,889 B2 | 6/2020 | Vasseur et al. |
| 10,715,996 B1 | 7/2020 | Singh et al. |
| 11,138,861 B2 | 10/2021 | Blatt et al. |
| 11,424,993 B1 | 8/2022 | Chaoji et al. |

(Continued)

FOREIGN PATENT DOCUMENTS

| | | |
|---|---|---|
| CN | 107750440 B | 12/2021 |
| DE | 102007049025 B4 | 6/2020 |

(Continued)

*Primary Examiner* — Frantz Coby
(74) *Attorney, Agent, or Firm* — Perkins Coie LLP

(57) ABSTRACT

Operation and management of a wireless telecommunication network is improved via reducing and preventing service condition faults by subscribers. Service condition faults occur when a subscriber fails to satisfy service conditions or requirements for receiving network services provided by the wireless telecommunication network. Service conditions faults can be intelligently reduced or prevented based on adjusting network service parameters or configurations for a subscriber in a manner that reduces a magnitude and/or volume of service conditions for the subscriber. A wireless telecommunication network implements a machine learning (ML) model that uses subscriber-specific data to classify a recurrence likelihood of the subscriber and a service condition fault, and based on the classification, select modified network service parameters or configurations to implement specifically for the subscriber.

20 Claims, 8 Drawing Sheets

(56) References Cited

U.S. PATENT DOCUMENTS

| | | |
|---|---|---|
| 12,184,509 B2 | 12/2024 | Shori et al. |
| 2001/0044840 A1 | 11/2001 | Carleton |
| 2005/0143086 A1* | 6/2005 | Schwarz ............... H04W 48/18 |
| | | 455/452.2 |
| 2009/0228566 A1 | 9/2009 | Sharp et al. |
| 2012/0123870 A1 | 5/2012 | Denman et al. |
| 2012/0280813 A1 | 11/2012 | Ahluwalia et al. |
| 2014/0187242 A1* | 7/2014 | Zhang .................... H04W 8/20 |
| | | 455/435.2 |
| 2015/0189044 A1 | 7/2015 | Pastor et al. |
| 2016/0282132 A1 | 9/2016 | Bostick et al. |
| 2018/0212837 A1 | 7/2018 | Kalluri et al. |
| 2020/0201735 A1 | 6/2020 | Livoti et al. |
| 2020/0322662 A1 | 10/2020 | Korte et al. |
| 2021/0337400 A1* | 10/2021 | Jat ......................... H04W 16/18 |
| 2022/0377582 A1 | 11/2022 | Sakamoto et al. |
| 2022/0417768 A1 | 12/2022 | Yao et al. |
| 2023/0418279 A1 | 12/2023 | Zhu et al. |
| 2024/0373324 A1* | 11/2024 | Glenn .................... H04L 63/101 |

FOREIGN PATENT DOCUMENTS

| | | | |
|---|---|---|---|
| EP | 1117221 A2 * | 7/2001 | ............. H04L 67/51 |
| EP | 1894403 A1 | 3/2008 | |
| EP | 2150067 B1 | 6/2013 | |
| EP | 2478665 B1 | 11/2014 | |
| WO | WO-2014106073 A1 * | 7/2014 | ............. H04W 8/18 |
| WO | 2015078485 A1 | 6/2015 | |
| WO | 2020086409 A1 | 4/2020 | |
| WO | WO-2024097129 A1 * | 5/2024 | ......... H04L 25/0224 |

\* cited by examiner

MACHINE LEARNING (ML)-BASED TECHNIQUES FOR ADJUSTING NETWORK SERVICE PARAMETERS FOR SUBSCRIBERS OF A WIRELESS TELECOMMUNICATION NETWORK

TECHNICAL FIELD

The present disclosure relates to wireless telecommunication networks, and in particular, to techniques for managing and communicating with subscriber devices of said networks.

BACKGROUND

Wireless telecommunication networks provide communication services for end users at user devices that are subscribed to the networks. The user devices subscribed to a wireless telecommunication network are also referred herein as subscriber devices. These communication services provided by a wireless telecommunication network include connectivity to data networks (e.g., the Internet, an Internet Protocol (IP) network), telephone calling services, text messaging services, and more. Efficient operation of a wireless telecommunication network requires management of access to and usage of these communication services by subscriber devices.

BRIEF DESCRIPTION OF THE DRAWINGS

Detailed descriptions of implementations of the present invention will be described and explained through the use of the accompanying drawings.

Figure 1:
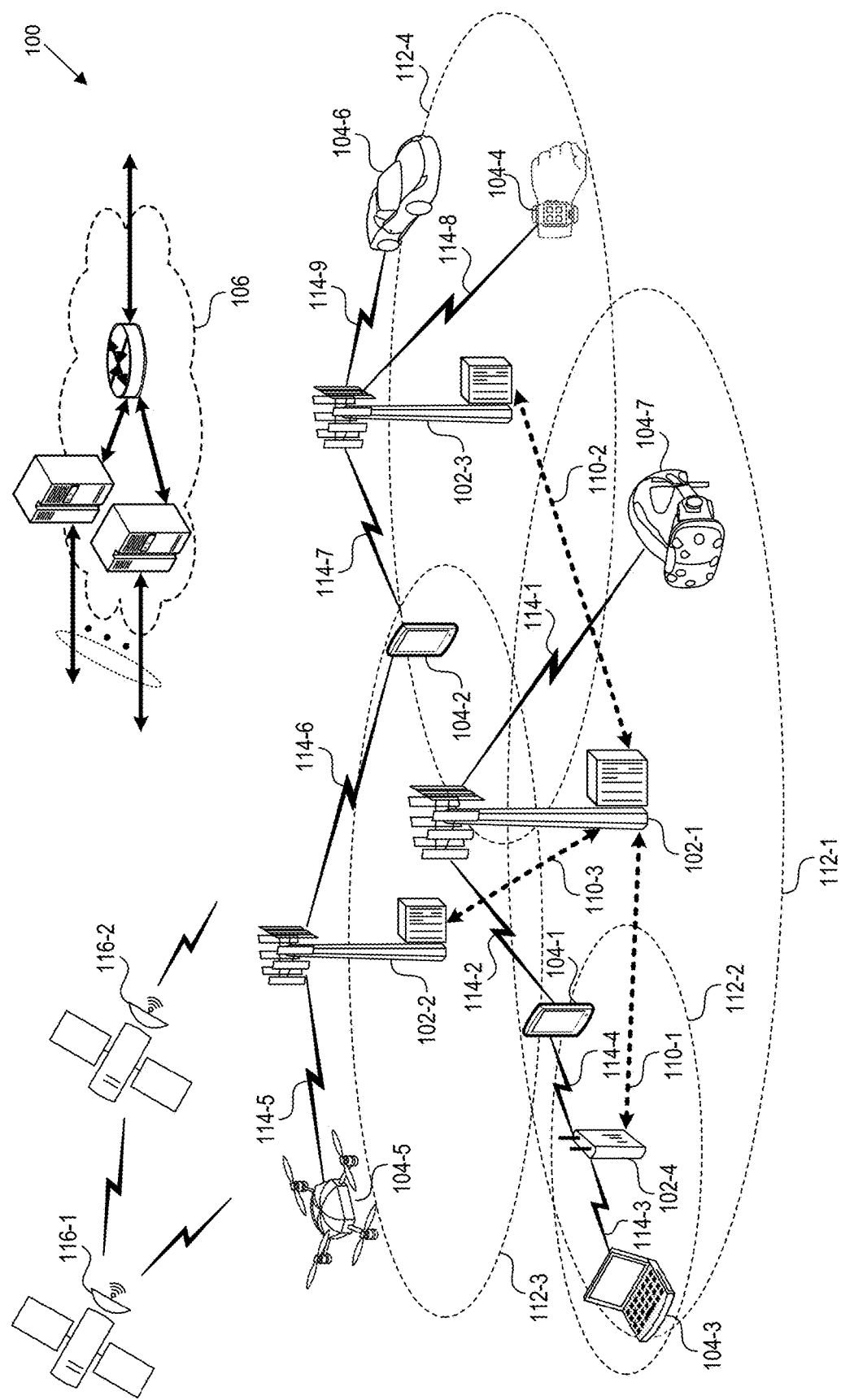
FIG. 1 is a block diagram that illustrates a wireless telecommunication network that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Existing subscriber management techniques and systems fail to consider contextual or upstream solutions to service condition faults, such as a subscriber failing to complete a service payment. While existing technologies may provide remedial solutions after the service condition faults, these existing technologies lack intelligent and personalized options to prevent future service condition faults. The present disclosure provides contextualized, personalized, and intelligently-determined adjustments of service configurations and service parameters to avoid future, subsequent, or repeated service condition faults. For example, the disclosed technology implements AI/ML models that can modify what network services, limits on service usage/access, and more in order to correspondingly adjust service conditions to a more manageable state for subscribers.

The present disclosure relates to ML-based adjustments of network service parameters for subscribers of a wireless telecommunication network. A wireless telecommunication network implements an AI/ML model that intelligently selects or determines modified network service parameters for a subscriber, for example, subsequent to the network detecting a service condition fault of the subscriber. According to example implementations, the use of modified network service parameters that are intelligently selected according to subscriber-specific data reduces a likelihood of recurring service condition faults of the subscriber. In particular, modified network service parameters can reduce a magnitude, volume, and/or other attributes of service conditions that the subscriber is required to satisfy in order to receive network services from the wireless telecommunication network. Example implementations thus provide technical benefits related to minimizing service condition faults, which are non-optimal for the operation of a wireless telecommunication network and would otherwise require the expensive use of network resources to manage, anticipate, and resolve.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Example Wireless Communications Systems

FIG. 1 is a block diagram that illustrates a wireless telecommunication network 100 in which aspects of the disclosed technology are incorporated. The wireless telecommunication network 100 provides network services to its subscribers, example network services including data network access or connectivity (e.g., mobile broadband or cellular data for accessing the Internet), telephone calling services, text messaging services, cloud storage and/or computing services, and/or the like. In particular, the wireless telecommunication network 100 provides the network services to subscribers that satisfy subscriber service conditions (also referred to as service requirements, subscription requirements, access conditions, and/or the like). Example subscriber service conditions can include device compatibility (e.g., a subscriber device being a device manufactured, provided, and/or sold by a network operator of the wireless telecommunication network, a subscriber device storing a specific user application for interfacing with the wireless telecommunication network, a subscriber device having a particular hardware and/or software configuration), service payments (e.g., as a recurring or periodic bill payment, a one-time payment), location requirements (e.g., a subscriber device being located in a particular region or jurisdiction covered by the wireless telecommunication network). Failure by a subscriber to satisfy service conditions results in the wireless telecommunication network 100 initiating resource-intensive processes for restricting/limiting access or usage of network services by the subscriber. Accordingly, example implementations of the present disclosure improve the operation of the wireless telecommunication network by reducing a likelihood that service condition faults occur.

The wireless telecommunication network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The wireless telecommunication network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of the wireless telecommunication network 100 also include wireless devices 104-1 through 104-7 (referred to individually as "wireless device 104" or collectively as "wireless devices 104" and also referred to herein as user equipment or UE) and a core network 106. The wireless devices 104-1 through 104-7 can correspond to or include network entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

Wireless devices 104 can include subscriber devices. Subscriber devices include devices that are associated with subscriber entities (e.g., a person, a group of persons, a defined organization or entity) who subscribe to the wireless telecommunication network (in particular, to a network provider or operator associated with the wireless telecommunication network) to receive network services via the wireless telecommunication network from the network provider or operator, based on satisfying service conditions. Different subscriber entities belonging to the wireless telecommunication network 100 can be constrained with different service conditions, and the service conditions can correspond to the network service parameters or configurations for a subscriber entity. For example, a subscriber entity that receives (e.g., "subscribes" to) telephone calling services and text messaging services is constrained by a first service condition, and another subscriber entity that receives mobile broadband services in addition to the telephone calling services and text messaging services is constrained by a second service condition (e.g., a higher bill payment). In some examples, a magnitude of a service condition can correspond to a number of subscriber devices associated with the subscriber (e.g., a number of telephone calling "lines"). Thus, a subscriber can satisfy its service conditions relatively easier if the subscriber is associated with a lower number of subscriber devices and reduced network services (or network service parameters), in some examples.

The wireless telecommunication network 100 can store subscriber data that describes the different service conditions and network service parameters for different subscriber entities. For example, the wireless telecommunication network 100 includes one or more subsystems that store subscriber data or a subscriber profile indicating (i) which network services that a subscriber "subscribes" to, (ii) limits of the network services (e.g., a data volume limit for mobile broadband, a number of minutes for telephone calling services), (iii) service conditions for providing the network services to the subscriber, and/or the like. According to example implementations, the wireless telecommunication network 100 is configured to monitor the service conditions and determine or predict a service condition fault, in response to which the wireless telecommunication network 100 would implement restrictions or limits in network access policies for the subscriber.

Wireless devices 104 of the wireless telecommunication network 100 vary in type and capability. For example, the wireless devices 104 illustrated in FIG. 1 includes a head-mounted device (HMD) that is configured to execute XR services (104-7), a smart watch device (104-4), a mobile phone (104-1), and others. The wireless devices 104 each execute different services or applications and according to aspects of the disclosed technology, handover of the wireless devices 104 within the wireless telecommunication network 100 is specific to each wireless device 104 and the services or applications presently being executed at each wireless device 104.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The wireless telecommunication network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The wireless telecommunication network 100 can include a 5G network and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The wireless telecommunication network 100 can thus form a heterogeneous network in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the wireless telecommunication network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed d throughout the wireless telecommunication network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network equipment at the edge of the wireless telecommunication network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in wireless telecommunication network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links. In handover operations, communication links 114 can be created, redirected or modified, and/or terminated in order to provide UE mobility within the wireless telecommunication network 100.

In some implementations of the wireless telecommunication network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the wireless telecommunication network 100 implements 6G technologies including increased densification or diversification of network nodes. The wireless telecommunication network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the wireless telecommunication network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the wireless telecommunication network 100 can implement a converged Radio Access Network (RAN) and Core architecture to achieve Control and User Plane Separation (CUPS) and achieve extremely low User Plane latency. In yet another example of 6G, the wireless telecommunication network 100 can implement a converged Wi-Fi and Core architecture to increase and improve indoor coverage.

Example Telecommunication Network Functions

Figure 2:
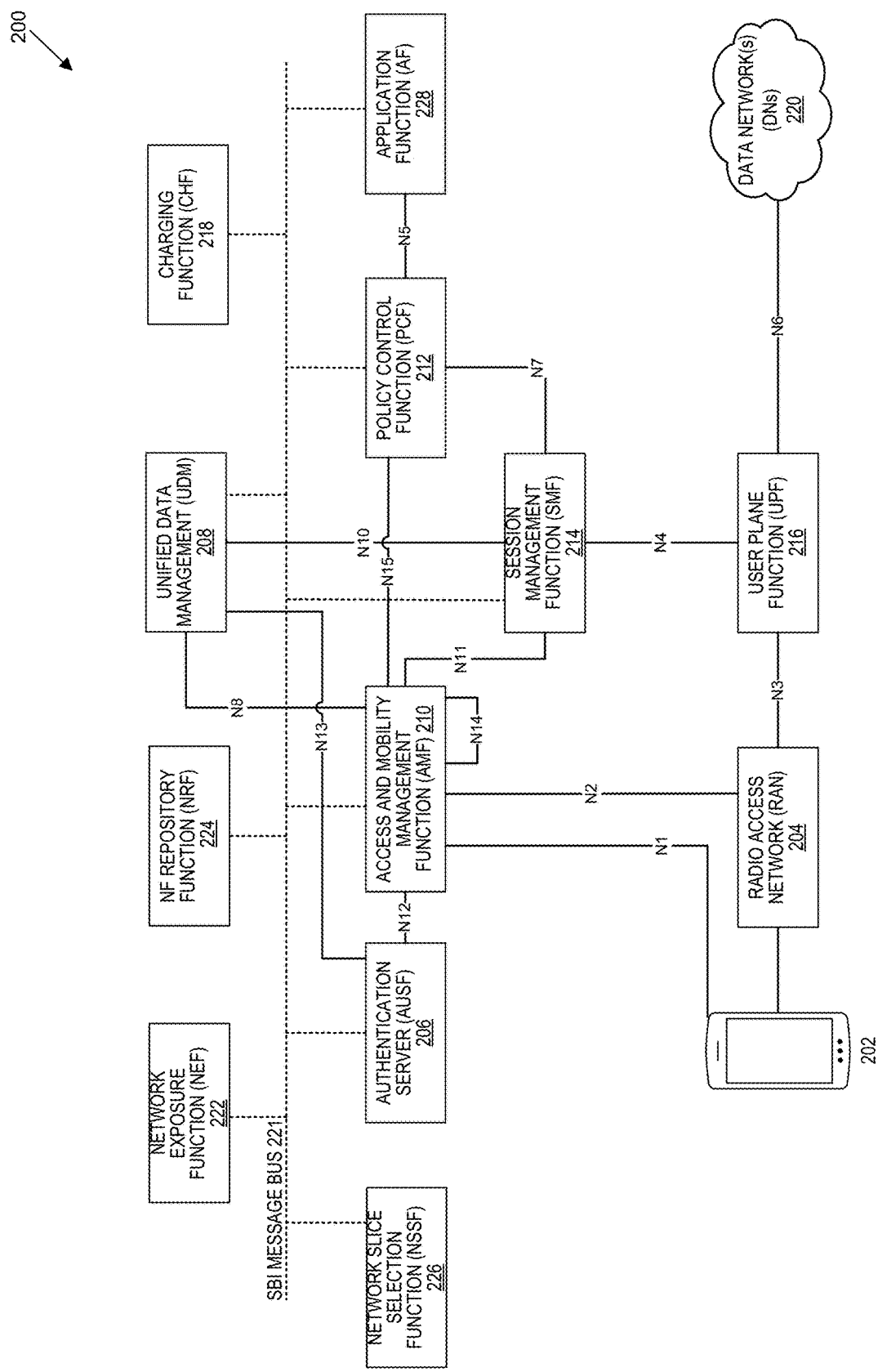
FIG. 2 is a block diagram that illustrates network functions (NFs) of a wireless telecommunication network that can implement aspects of the present technology.

FIG. 2 is a block diagram that illustrates an architecture 200 including network functions (NFs) that are related to aspects of the present technology. For example, the network functions in the illustrated example belong to a 5G core network. It will be appreciated that the disclosed technology is also applicable to network functions associated with a 4G LTE core network (e.g., Evolved Packet Core, or EPC), a 6G core network, and/or the like.

According to FIG. 2, a wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218. In some implementations, one or more NFs of the core network perform example operations described herein to detect network-supported services being executed by a UE, provide event thresholds that correspond to network-supported services to UEs, and facilitate handover of UEs between network cells and/or nodes.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Example Implementations of Managing Subscriber Devices

Example implementations provide techniques for intelligently configuring network service configurations and parameters that define: what network services are available to a subscriber, constraints or limits on the usage of a network service by the subscriber, a number of subscriber devices that can be used by the subscriber, service conditions or prerequisites that are satisfied by the subscriber to use a network service (e.g., a bill payment), device information and compatibility of a subscriber device at which network services are provided, and more. Example implementations include AI/ML models that determine modified and subscriber-specific network service configurations in order to minimize service condition faults by subscribers and to maintain service availability for subscribers. In some implementations, AI/ML models determine modified network service configurations based on a predicted likelihood that future service condition faults will occur given a current network service configuration. For example, AI/ML models can classify subscribers into recurrence categories that correspond to different said likelihoods.

Figure 3:
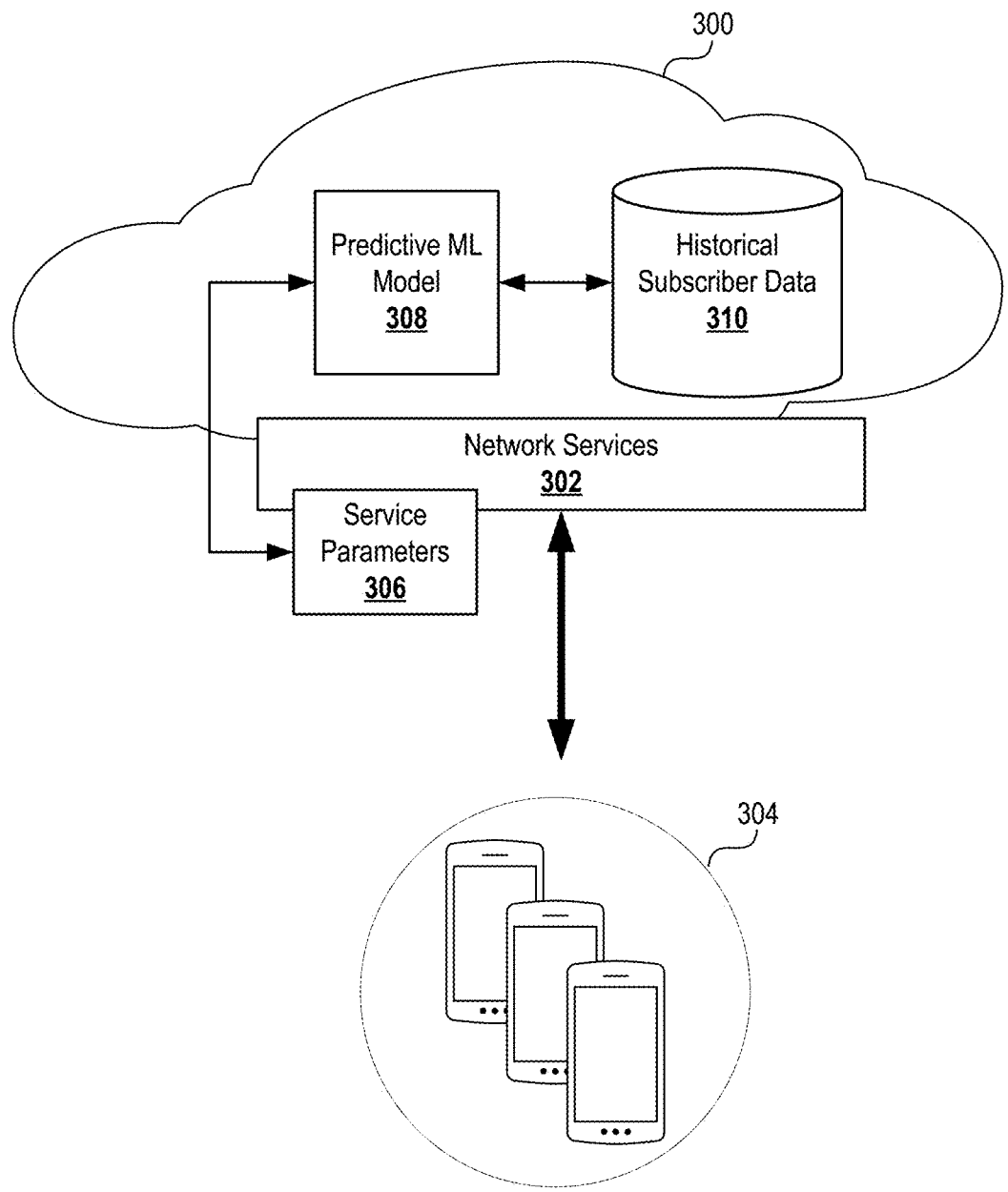
FIG. 3 is a block diagram that illustrates a system implemented with a wireless telecommunication network to recommend and adjust network service parameters related to network services provided by the wireless telecommunication network to subscriber devices.

FIG. 3 illustrates an example implementation of a system in which a wireless telecommunication network can dynamically and intelligently adjust network service parameters to preempt service condition faults by subscribers and to maintain network service availability for subscribers. A wireless telecommunication network 300 provides network services 302 (e.g., mobile broadband, calling, text messaging) to subscriber devices 304 associated with a subscriber. The wireless telecommunication network 300 stores network service configurations or service parameters 306 that define how the wireless telecommunication network 300 provides the network services 302 to the subscriber devices 304 of the subscriber. In some implementations, the wireless telecommunication network 300 stores the network service configurations or service parameters 306 as subscriber information and policies managed, accessed, updated, and implemented in core network functions of the wireless telecommunication network 300.

In some implementations, the service parameters 306 correspond to a number, volume and/or magnitude of service conditions for which the wireless telecommunication network monitors the subscriber. For example, given a service parameter 306 that defines a high number of subscriber devices that a subscriber can connect to the wireless telecommunication network 300, a bill payment service condition for the subscriber can be correspondingly high (relative to another subscriber that is configured with a lower number of subscriber devices). As another example, service parameters 306 that lower a minimum mobile broadband latency for the subscriber can correspond to less strict service conditions that permit subscriber devices to be located at cell edge regions of the wireless telecommunication network 300. As yet another example, service parameters 306 that limit subscriber devices to only one of a 4G network and a 5G network included in the wireless telecommunication network 300 correspond to less strict service conditions on device network compatibility. Thus, given service parameters that place relatively less constraints on network service usage and access, service conditions (e.g., bill payments, location constraints, network-type support) for the subscriber are also less constrained or less strict. In some implementations, the wireless telecommunication network 300 is configured to dynamically determine and/or adjust service conditions for a subscriber based on service parameters 306 or configurations for the subscriber.

In FIG. 3, the wireless telecommunication network 300 implements an AI/ML model 308 that is configured to dynamically adjust (or recommend adjustments for) the service parameters 306 or service configuration for a subscriber. In some implementations, the AI/ML model 308 dynamically adjusts or recommends adjustments for the service parameters 306 in response to service condition faults by the subscriber, and in particular, the AI/ML model 308 determines upstream modifications to the service parameters 306 that result in downstream changes to service conditions or prerequisites. Thus, the wireless telecommunication network 300 implements the AI/ML model 308 at least in part to dynamically manage service conditions or prerequisites for subscribers in a manner that improves a subscriber's ability to satisfy the service conditions/prerequisites and avoids network service suspension or restriction for the subscriber.

In doing so, example implementations of the AI/ML model 308 can receive historical subscriber data 310 that is stored by the wireless telecommunication network 300 and that describes historical service condition faults, historical service parameters/configuration modifications, and/or the like for a subscriber or a group of subscribers. For example, the AI/ML model 308 is trained on the historical subscriber data 310 for a group of subscribers and/or uses the historical subscriber data 310 for a particular subscriber to dynamically modify the service parameters 306 for the particular subscriber. In some implementations, the AI/ML model 308 also receives information that describes a particular service condition fault by a subscriber in response to which the AI/ML model 308 will dynamically adjust service parameters. For example, the AI/ML model 308 receives an indication of a type of service condition fault (e.g., past due bill payment, out-of-network location, network-type incompatibility), a magnitude of the service condition fault (e.g., a past due amount on the bill payment), and/or the like.

Figure 4:
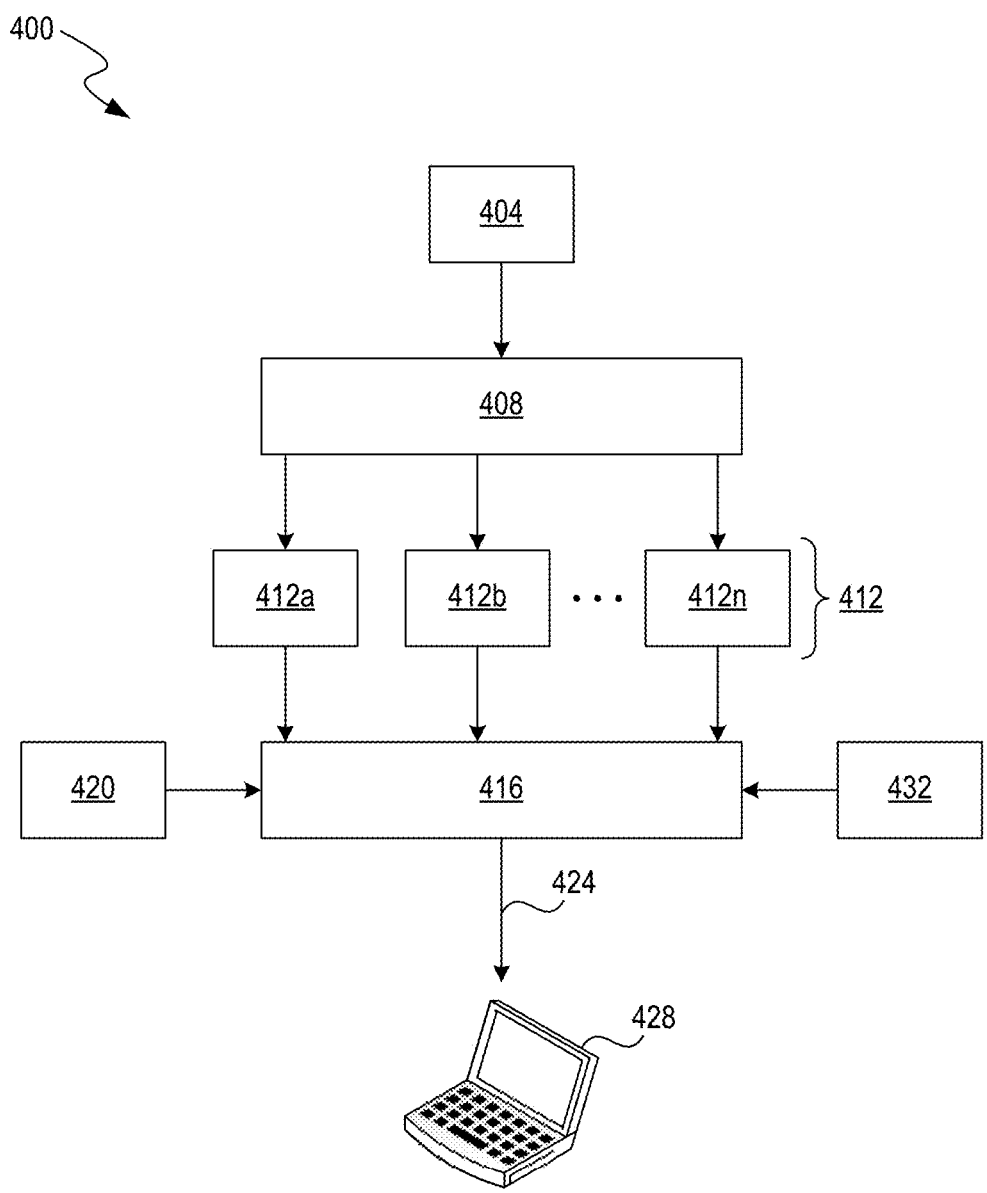
FIG. 4 is a block diagram that illustrates an example artificial intelligence or machine learning (AI/ML) system.

FIG. 4 illustrates an example of a ML system 400 that can be implemented by a wireless telecommunication network 300 to dynamically manage service parameters and configurations for a subscriber, for example, in response to a service condition fault by the subscriber. In some implementations, the ML system 400 is a computer system with instructions programmed in its main memory that execute example operations and processes disclosed herein to train and run a model. Likewise, implementations of the ML system 400 can include different and/or additional components or be connected in different ways, distributed over multiple computing systems, and/or the like. The ML system 400 can be referred to as a ML module.

The ML system 400 includes a feature extraction module 408. In some embodiments, the feature extraction module 408 extracts a feature vector 412 from input data 404. For example, the input data 404 can include an indication of a service condition fault by a subscriber, current service configuration or parameters for the subscriber, historical data for the subscriber that indicates previous service condition faults and/or previous adjustments to service configurations or parameters, and/or the like.

The feature vector 412 includes features 412a, 412b, . . . , 412n. The feature extraction module 408 reduces the redundancy in the input data 04, e.g., repetitive data values, to transform the input data 404 into the reduced set of features 412, e.g., features 412a, 412b, . . . , 412n. The feature vector 412 includes the relevant information from the input data 404, such that events or data value thresholds of interest can be identified by the ML model 416 by using this reduced representation. In some example embodiments, the following dimensionality reduction techniques are used by the feature extraction module 408: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

In some embodiments, the ML model 416 performs deep learning (also known as deep structured learning or hierarchical learning) directly on the input data 404 to learn data representations, as opposed to using task-specific algorithms. In deep learning, no explicit feature extraction is performed; the features 412 are implicitly extracted by the ML system 400. For example, the ML model 416 can use a cascade of multiple layers of nonlinear processing units for implicit feature extraction and transformation. Each successive layer uses the output from the previous layer as input. The ML model 416 can thus learn in supervised (e.g., classification) and/or unsupervised (e.g., pattern analysis) modes. The ML model 416 can learn multiple levels of representations that correspond to different levels of abstraction, wherein the different levels form a hierarchy of concepts. In this manner, the ML model 416 can be configured to differentiate features of interest from background features. For example, at an intermediate layer of the ML model 416, the ML model 416 determines a likelihood that a service condition fault indicated in the input data 404 will reoccur based on an aggregation and weighting of other features extracted form the input data 404.

In one example, the ML model 416, e.g., in the form of a CNN generates the output 424, without the need for feature extraction, directly from the input data 404. In some examples, the output 424 is provided to the computer device 428. For example, the computer device 428 is a server system or computing system included in the wireless telecommunication network, such as a subscriber management system of the wireless telecommunication network.

A CNN is a type of feed-forward artificial neural network in which the connectivity pattern between its neurons is inspired by the organization of a visual cortex. Individual cortical neurons respond to stimuli in a restricted area of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

The ML model 416 can be a CNN that includes both convolutional layers and max pooling layers. The architecture of the ML model 416 can be "fully convolutional," which means that variable sized sensor data vectors can be fed into it. For all convolutional layers, the ML model 416 can specify a kernel size, a stride of the convolution, and an amount of zero padding applied to the input of that layer. For the pooling layers, the model 216 can specify the kernel size and stride of the pooling.

In some embodiments, the ML system 400 trains the ML model 416, based on the training data 420 or a training dataset, to correlate the feature vector 412 to expected outputs in the training data 420. As part of the training of the ML model 416, the ML system 400 forms a training set of features and training labels by identifying a positive training set of features that have been determined to have a desired property in question, and, in some embodiments, forms a negative training set of features that lack the property in question.

The ML system 400 applies ML techniques to train the ML model 416, that when applied to the feature vector 412, outputs indications of whether the feature vector 412 has an associated desired property or properties, such as a probability that the feature vector 412 has a particular Boolean property, or an estimated value of a scalar property. The ML system 400 can further apply dimensionality reduction (e.g., via linear discriminant analysis (LDA), PCA, or the like) to reduce the amount of data in the feature vector 412 to a smaller, more representative set of data.

The ML system 400 can use supervised ML to train the ML model 416, with feature vectors of the positive training set and the negative training set serving as the inputs. In some embodiments, different ML techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example embodiments, a validation set 432 is formed of additional features, other than those in the training data 420, which have already been determined to have or to lack the property in question. The ML system 400 applies the trained ML model 416 to the features of the validation set 432 to quantify the accuracy of the ML model 416. Common metrics applied in accuracy measurement include: Precision and Recall, where Precision refers to a number of results the ML model 416 correctly predicted out of the total it predicted, and Recall is a number of results the ML model 416 correctly predicted out of the total number of features that had the desired property in question. In some embodiments, the ML system 400 iteratively re-trains the ML model 416 until the occurrence of a stopping condition, such as the accuracy measurement indication that the ML model 416 is sufficiently accurate, or a number of training rounds having taken place. The validation set 432 can include data corresponding to confirmed anatomical features, tissue states, tissue conditions, diagnoses, or combinations thereof. This allows the detected values to be validated using the validation set 432. The validation set 432 can be generated based on analysis to be performed.

Figure 5:
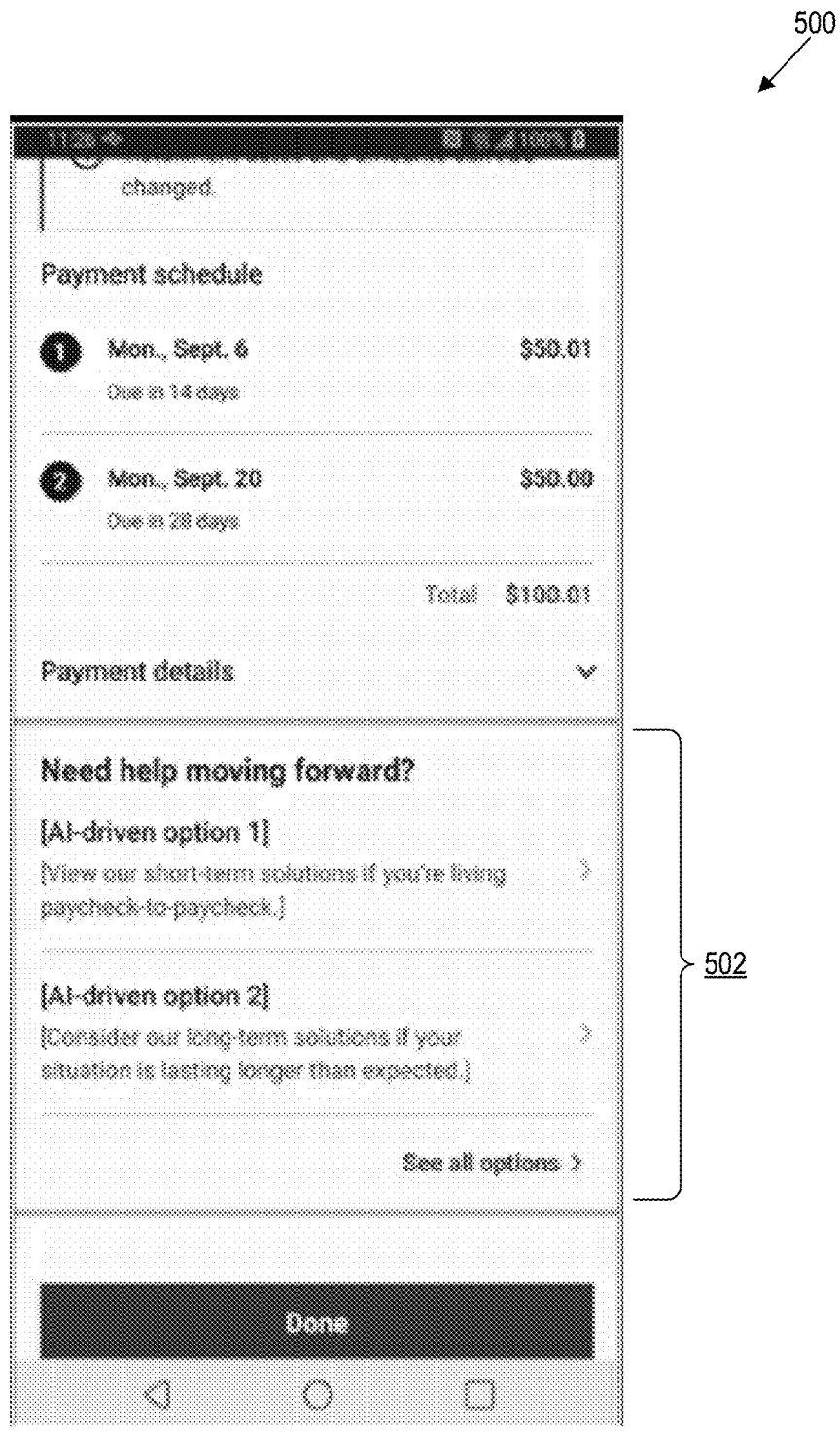
FIG. 5 illustrates an example of a user application at a subscriber device via which modified network service parameters are indicated to a subscriber of a wireless telecommunication network.

FIG. 5 illustrates an example of dynamic adjustments to service parameters and recommendations thereof provided to a subscriber device (e.g., a subscriber device 304 connected to the wireless telecommunication network 300). Based on the wireless telecommunication network implementing the AI/ML model to intelligently determine a modified service configuration or parameters, the wireless telecommunication network can indicate the modified service configuration or parameters to one or more of the subscriber devices associated with the subscriber. For example, in FIG. 5, a local user application stored at a subscriber device displays a user interface 500 that includes one or more modified network service configurations 502 for selection by the user of the subscriber device.

Via the subscriber device, a user of the subscriber device can cause a modified network service configuration 502 to be implemented for the subscriber. For example, user input or user selection of a modified network service configuration 502 via the user interface 500 causes a message to be transmitted by the subscriber device to the wireless telecommunication network, in response to which the wireless telecommunication network (e.g., a subscriber management system thereof) implements the modified network service configuration 502. In some implementations, a user can specify a time period or duration for which to implement a modified network service configuration 502, and the subscriber device can indicate the specified time period or duration to the wireless telecommunication network.

Figure 6A:
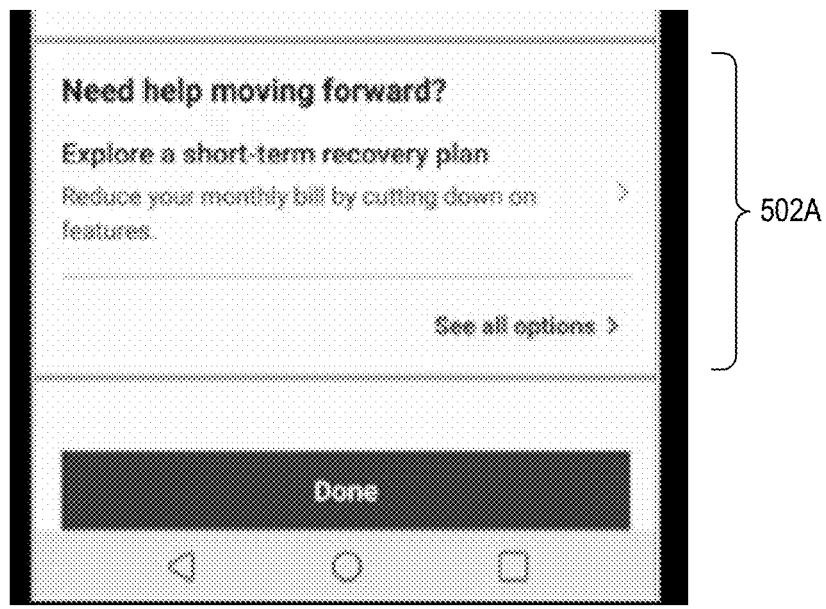
FIGS. 6A-6B illustrate examples of modified network service parameters provided to a subscriber of a wireless telecommunication network using an AI/ML model.
Figure 6B:
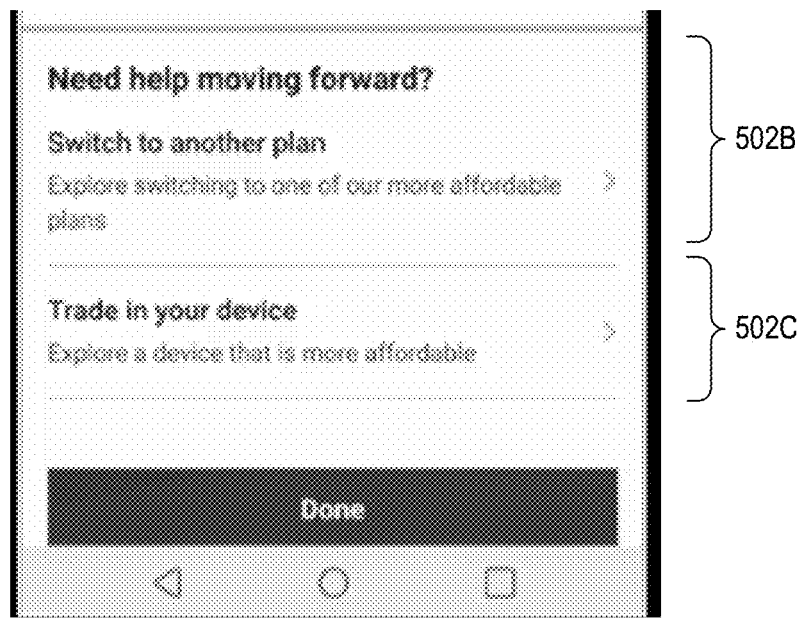

FIGS. 6A-6B illustrate example indications of modified network service configurations 502 provided at a subscriber device. Referring first to FIG. 6A, a first modified network service configuration 502A indicates a reduction in a number of network services provided to the subscriber, such as a configuration that omits mobile broadband services. With such a reduced service configuration, service conditions or prerequisites (e.g., bill payments) for the subscriber can be reduced in magnitude and/or volume, thus reducing the likelihood of future service condition faults. In FIG. 6B, a second modified network service configuration 502B is a less comprehensive service configuration, such as a configuration in which usage or access of network services is limits. For example, the second modified network service configuration 502B includes a data volume limit on a mobile broadband service, a cumulative time limit (e.g., "minutes") on telephone calling services, a limited number of text messages transmitted with a text messaging service, and/or the like.

Also in FIG. 6B, a third modified network service configuration 502C indicates an alternative subscriber device with reduced capabilities. For example, selection of the third modified network service configuration 502C can result in a current subscriber device being replaced with the alternative subscriber device with reduced capabilities. An example of an alternative subscriber device with reduced capabilities can include devices without 5G network support, devices with less memory storage capacity, devices with less computing power, and/or the like. Such devices can place less load on the wireless telecommunication network as such devices consume network services, and accordingly, the wireless telecommunication network can place lighter service conditions or prerequisites on such devices.

Figure 7:
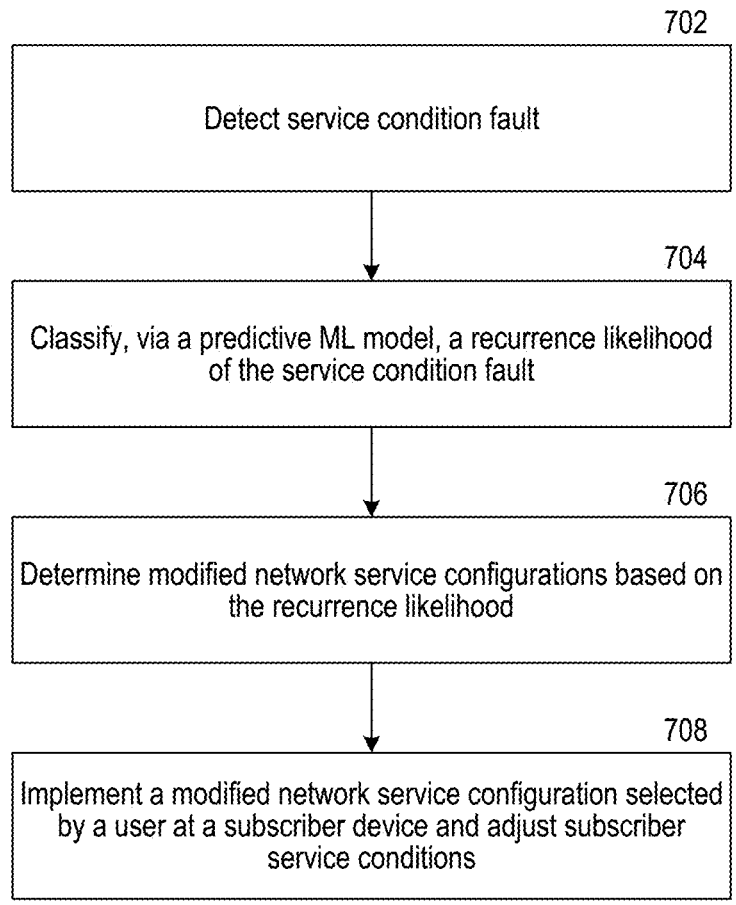
FIG. 7 is a flow diagram that illustrates example operations implemented for ML-based adjustment of network service parameters for subscribers of a wireless telecommunication network, in accordance with embodiments of the present disclosure.

FIG. 7 is a flow diagram that illustrates example operations implemented for dynamic and intelligent adjustment of network service configurations or parameters for subscriber of a wireless telecommunication network. The example operations can be implemented by the wireless telecommunication network, one or more computing systems therein, one or more computing systems associated with subscriber management for the wireless telecommunication network, one or more computing systems connected to the wireless telecommunication network, and/or the like. For example, the example operations can be implemented and performed by a ML system (e.g., the ML system 400 of FIG. 4) that is included in the wireless telecommunication network, connected to the wireless telecommunication network, and/or associated and operated by a network operator associated with the wireless telecommunication network. For example, the example operations can be implemented and performed by a subscriber management system that is included in the wireless telecommunication network, connected to the wireless telecommunication network, and/or associated and operated by the network operator of the wireless telecommunication network. The following description of the example operations is provided with respect to a subscriber management system according to one example implementation.

At 702, the subscriber management system detects a service condition fault by a subscriber of a wireless telecommunication network. For example, the subscriber management system detects that the subscriber is past due on a service payment. In some examples, the subscriber management system detects the service condition fault based on an event indicating the service condition fault being published to a network event queue. In the previously described example in which the subscriber is past due on the service payment, an account system or a payment system can publish an event indicating the example service condition fault to the network event queue. The subscriber management system can be configured to listen to the network event queue and detect the service condition fault accordingly.

In some implementations, the subscriber management system is configured to additionally, or alternatively, predict a service condition fault by a subscriber that is likely to occur. For example, the subscriber management system includes a prediction model that, when provided with present and/or historical subscriber-specific data, can predict whether a service condition fault (e.g., past due on a service payment) is likely to occur. In such implementations, the dynamic ML-based determination of service configuration/parameter modifications (according to subsequent operations in FIG. 7) is not predicated upon the occurrence of a service condition fault, in some examples, and can be implemented in a preventative manner before any service condition fault occurs or without any service condition fault occurring. In some examples, the subscriber management system determines a likelihood (e.g., via the prediction model) that a service condition fault will occur and compares the likelihood to a threshold for the prediction.

At 704, the subscriber management system classifies, via a ML model, a recurrence likelihood of the service condition fault. For example, the subscriber management system uses the ML model to classify or categorize the subscriber into a recurrence category, such as a temporary fault category or a persistent fault category. In some implementations, the subscriber management system can classify the subscriber into a preventative category if the service condition fault is predicted and has not occurred. For example, the ML model is a predictive ML model. In some implementations, the ML model can additionally, or alternatively, classify the subscriber into other relevant categories. For example, the ML model can predict whether the subscriber is likely to subscribe to a different wireless telecommunication network associated with a different network operator and cease subscription to the wireless telecommunication network altogether.

At 706, the subscriber management system determines modified network service configurations based on the recurrence likelihood (or a category to which the subscriber is classified). In some implementations, the ML model outputs the modified network service configurations, and the classification of the recurrence likelihood and/or subscriber categories is an intermediate output of the ML model (e.g., at an intermediate layer). In some implementations, the subscriber management system implements a second model that is configured and trained to receive a classification output of the ML model and select the modified network service configurations based on the classification output (or provide output weights for different pre-defined service configurations). For example, the second model is trained, based on historical data that includes historical selections of modified service configurations by subscribers of certain classified categories or with certain classified recurrence likelihoods, to map the classification output of the ML model to one or more modified service configurations likely to be selected by and relevant to the subscriber. In some implementations, certain service configurations are associated with certain subscriber categories, and based on the subscriber being classified to a particular category, the configurations associated with the particular category are automatically determined and provided to the subscriber.

In some implementations, the subscriber management system is configured to rank the modified network service configurations based on relevance to the subscriber, a number of previous selections by other subscribers, likelihood to mitigate service condition faults, and/or the like. For example, the second model implemented by the subscriber management system is a machine learning model that is trained and used to output weights for each of a set of modified configurations based on relevance to the subscriber, and the subscriber management system ranks the modified configurations based on the weights output by the model. The subscriber management system can then indicate the ranking of the modified configurations to the subscriber.

The following lists and describes examples of modified network service configurations that can be dynamically and intelligently determined by a subscriber management system for a subscriber. Some of the following examples relate to modifying what network services are provided, as well as modifying payment arrangements for payment-related service conditions or requirements. Other modified network service configurations besides those listed here can be implemented.

Short-term Subscription Reduction—removal of additional subscription perks and features (e.g., streaming services, international network roaming), no 5G-based mobile broadband service, and/or the like. Can be specified for a temporary duration (e.g., six months, eight months, one year) after which original subscription features are restored.

Hardship Pause—pause payment dates for a short time period. When payments resume, past due balance is split over 6-12 months.

Rate Plan Right-Fitting—provide recommendations on more affordable rate plans.

Switch to Prepaid—service conditions (e.g., bill payments) are required at an earlier point in time and/or before upcoming service period. Subsequent service condition faults (e.g., failure to pay service payment) results in automatic shut-off of all network services.

Device Switch—switch to an alternative device, for example, a device with reduced network or computing capabilities. Alternative device can have a lower price and can reduce or eliminate device-related payments.

Choose your Bill Due Date—Self-service option for a subscriber to specifically select a timeline for service conditions or prerequisites (e.g., a due date for service payment).

Flexible AutoPay—Enabling AutoPay withdrawal to align with pay day(s), including splitting across 2 dates/month.

Hardship Insurance—Anticipate future payment-related service condition faults by paying extra during current payments to cover future payments if a future payment cannot be completed.

Annual or Semi-annual Subscription Plan—extend duration between service condition or prerequisite monitoring (e.g., making service payments on an annual or semi-annual basis).

1: Many Relation—split payment-related service conditions between multiple users or groups of users belonging to the subscriber.

At 708, the subscriber management system implements a modified network service configuration selected by a user at a subscriber device and adjusts the service conditions for the subscriber accordingly. The user selection of a modified network service configuration can occur at a subscriber device associated with the subscriber and in response to the subscriber management system causing display of the modified network service configurations determined at 706.

In some implementations, the subscriber management system causes display of or transmits the modified network service configurations to a subset of the subscriber devices associated with the subscriber. In particular, a subscriber can include multiple users of multiple subscriber devices, with each user being configured with a permission level that limits or enables the user to manage and modify subscriber or subscription information. Accordingly, the subscriber management system can refer to subscriber data that indicates the permission levels of users and transmit the modified network service configurations to subscriber devices with users having permission levels that permit or authorize the users to select service configurations for the subscriber. Similarly, if the subscriber management system detects a user selection of a modified network service configuration by a user who is not associated with the appropriate permission level (via a subscriber device used by the user), the subscriber management system can refuse or block the user selection.

In some implementations, different users and subscriber devices are identified in the subscriber data as mobile station international subscriber directory numbers, or MSISDNs, or other unique identifiers, and the subscriber management systems uses these unique identifiers to transmit the modified network service configurations. When receiving the modified network service configurations, a subscriber device can display the modified network service configurations in a user interface (e.g., similar to the user interfaces shown in FIGS. 5 and 6A-6B) for user selection. In some implementations, the subscriber management system indicates the ranking of the modified network service configurations to the subscriber device, which displays the modified configurations according to the ranking.

In some implementations, the modified network service configuration is associated with a time period or duration, and the subscriber management system reimplements an original or previous network service configuration after the time period or duration. In some examples, the time period or duration is specified by the user when selecting the modified network service configuration.

In some implementations, the subscriber management system implements the modified network service configuration based on updating or modifying an access policy for the subscriber stored and used by one or more core network functions of the wireless telecommunication network. In some implementations, the prediction model used by the subscriber management system to predict the service condition fault predicts a time at which the service condition fault will occur, and the subscriber management system implements the modified network service configuration prior to the predicted time.

In some examples, the modified network service configuration corresponds to a change in a particular service condition/requirement that the subscriber failed to satisfy (or is predicted to satisfy). When implementing the modified network service configuration, the subscriber management system can modify and update the particular service condition/requirement, as indicated or stored in subscriber data.

Example Computer Systems

Figure 8:
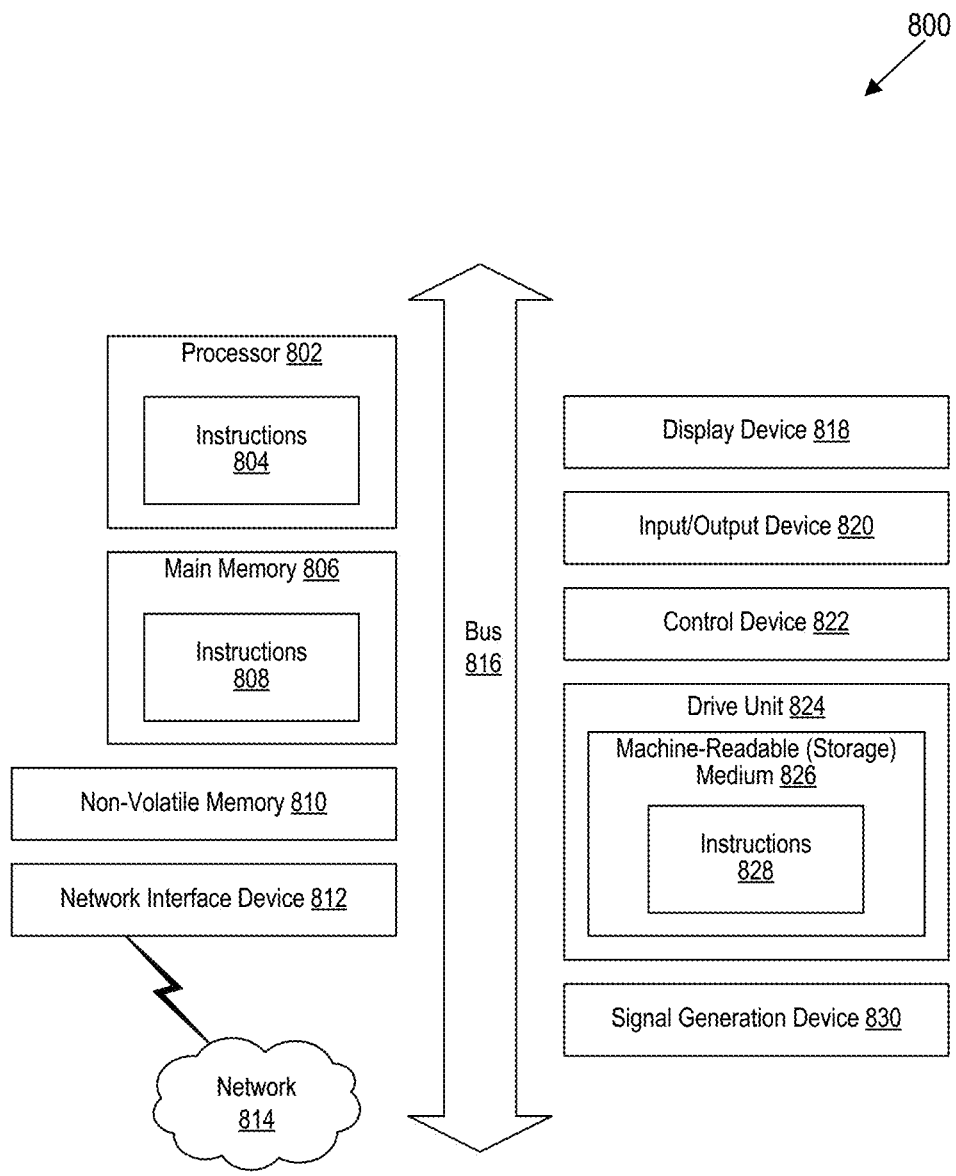
FIG. 8 is a block diagram that illustrates an example of a computer system in which at least some operations described herein can be implemented.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, video display device 818, an input/output device 820, a control device 822 (e.g., keyboard and pointing device), a drive unit 824 that includes a storage medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computer system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 800. In some implementation, the computer system 800 can be an embedded computer system, a system-on-chip (SOC), a single-board computer system (SBC) or a distributed system such as a mesh of computer systems or include one or more cloud components in one or more networks. Where appropriate, one or more computer systems 800 can perform operations in real-time, near real-time, or in batch mode.

The network interface device 812 enables the computer system 800 to mediate data in a network 814 with an entity that is external to the computer system 800 through any communication protocol supported by the computer system 800 and the external entity. Examples of the network interface device 812 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable (storage) medium 826 can include any medium that is capable of storing, encoding, or carrying a set of instructions for execution by the computer system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computer system 800 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the disclosed technology. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the present disclosure, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the present disclosure should not be taken to imply that the terminology is being redefined herein to be restricted to any specific characteristics, features, or aspects of the present disclosure with which that terminology is associated. In general, the terms used in the following claims should not be construed to limit the present disclosure to the specific examples disclosed herein, unless the above Detailed Description explicitly defines such terms. Accordingly, the actual scope of the present disclosure encompasses not only the disclosed examples, but also all equivalent ways of practicing or implementing the disclosed technology under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the disclosed technology can be modified to employ the systems, functions, and concepts of the various references described above to provide yet further implementations of the disclosed technology.

To reduce the number of claims, certain implementations are presented below in certain claim forms, but the applicant contemplates various aspects of the disclosed technology in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. At least one non-transitory computer-readable storage medium carrying instructions that, when executed by at least one processor, performs operations for adjusting network service parameters, the operations comprising:
   detecting a service condition fault by a subscriber associated with a wireless telecommunication network, the service condition fault related to a set of network services that are provided by a network provider of the wireless telecommunication network to the subscriber at one or more subscriber devices connected to the wireless telecommunication network,
      wherein the set of network services for the subscriber are defined by a first network service configuration that is assigned to the subscriber and that includes first network service parameters that indicate (i) which network services are included in the set of network services for the subscriber and (ii) a number of the one or more subscriber devices to which the network services are provided;
   classifying, via a machine learning (ML) model, the subscriber to a particular recurrence category of a plurality of recurrence categories that correspond to likelihoods that the service condition fault will reoccur,
      wherein the subscriber is classified based on historical subscriber-specific data obtained by the wireless telecommunication network for the subscriber, and
      wherein the ML model is trained to classify the subscriber based on a training dataset that describes historical occurrences of service condition faults for a plurality of subscribers of the wireless telecommunication network;
   according to the particular recurrence category to which the subscriber is classified via the machine learning (ML) model, selecting a plurality of second network service configurations that each include a modification to at least one of the first network service parameters of the first network service configuration,
      wherein each second network service configuration constrains the set of network services defined by the first network service configuration; and
   causing the network provider to implement a particular second network service configuration such that the network provider provides the set of network services to the subscriber according to the particular second network service configuration,
      wherein the particular second network service configuration is implemented in response to a user selection of the particular second network service configuration via at least one of the one or more subscriber devices of the subscriber.

2. The at least one non-transitory computer-readable storage medium of claim 1, wherein causing the network provider to implement the particular second network service configuration includes modifying a service condition that the subscriber fails to satisfy in the service condition fault, the service condition being modified for a duration that the particular second network service configuration is implemented.

3. The at least one non-transitory computer-readable storage medium of claim 1, wherein the ML model is further trained to select the plurality of second network service configurations for the subscriber according to historical selections of constrained network service configurations by the plurality of subscribers.

4. The at least one non-transitory computer-readable storage medium of claim 1, wherein the user selection of the particular second network service configuration includes a specified time period for which to implement the particular second network service configuration, and wherein the operations further comprise:
   subsequent to the specified time period, causing the network provider to implement the first network service configuration.

5. The at least one non-transitory computer-readable storage medium of claim 1, wherein the one of the subscriber devices at which the user selection occurs is associated with a particular permission level, and wherein the operations further comprise:
   detecting a second user selection of a second network service configuration at a second subscriber device that is associated with a second permission level; and
   refusing the second user selection.

6. The at least one non-transitory computer-readable storage medium of claim 1, wherein the operations further comprise:
    determining, via the ML model, a ranking of the plurality of second network service configurations according to a predicted relevance to the subscriber and the service condition fault; and
    causing the subscriber devices to display the plurality of second network service configurations according to the ranking.

7. A method implemented by a wireless telecommunication network, the method comprising:
    detecting that a subscriber associated with the wireless telecommunication network fails to satisfy a service condition that is required for a set of network services provided to the subscriber according to a first network service configuration;
    predicting, via a ML model, a recurrence likelihood for the subscriber that indicates whether the subscriber will likely fail to satisfy the service condition again,
        wherein the recurrence likelihood is predicted based on historical subscriber-specific data obtained by the wireless telecommunication network for the subscriber,
        wherein the ML model is trained to predict the recurrence likelihood based on a training dataset that describes historical occurrences of service condition faults for a plurality of subscribers of the wireless telecommunication network that failed to satisfy the service condition;
    selecting, according to the recurrence likelihood, a plurality of second network service configurations that modify the set of network services provided to the subscriber and the service condition that the subscriber fails to satisfy;
    causing the plurality of second network service configurations to be displayed at one or more subscriber devices associated with the subscriber; and
    implementing a particular second network service configuration at the wireless telecommunication network to constrain the set of network services provided to the subscriber in response to a user selection of the particular second network service configuration from the plurality of second network service configurations.

8. The method of claim 7, wherein at least one of the second network service configurations modifies one or more of: a number of network services provided to the subscriber, or a number of subscriber devices to which the set of network services are provided.

9. The method of claim 7, wherein the particular second network service configuration is implemented for a time period until the subscriber satisfies the service condition according to the first network service configuration, and wherein the method further comprises:
    reimplementing the first network service configuration based on the recurrence likelihood being lower than a threshold likelihood.

10. The method of claim 7, wherein the plurality of second network service configurations are selected via the ML model, wherein the ML model is trained to select the plurality of second network service configurations for the subscriber according to historical selections of network service configurations by the plurality of subscribers.

11. The method of claim 7, wherein the one or more subscriber devices at which the plurality of second network service configurations are displayed are associated with a particular permission level that enables users of the one or more subscriber devices to modify subscriber information.

12. The method of claim 7, wherein selecting the plurality of second network service configurations includes ranking the plurality of second network service configurations for the subscriber via the ML model according to a relevance to the subscriber, and wherein the plurality of second network service configurations are displayed at the subscriber devices according to the ranking.

13. A system comprising:
    at least one hardware processor; and
    at least one memory storing instructions that, when executed by the at least one hardware processor, cause the system to:
        detect a service condition fault by a subscriber associated with a wireless telecommunication network in connection with the subscriber receiving a set of network services defined by a first network service configuration from a network provider of the wireless telecommunication network;
        classify, via a ML model, the subscriber to a particular recurrence category of a plurality of recurrence categories that correspond to likelihoods that the service condition fault will reoccur;
        select, according to the particular recurrence category, a plurality of second network service configurations that modify a service condition that the subscriber fails to satisfy in the service condition fault; and
        implement a particular second network service configuration at the wireless telecommunication network in response to a user selection of the particular second network service configuration from the plurality of second network service configurations.

14. The system of claim 13, wherein a given second network service configuration modifies the service condition based on defining at least one of: a reduced set of network services, or a reduced number of subscriber devices for the subscriber.

15. The system of claim 13, wherein the instructions further cause the system to:
    train the ML model to select the plurality of second network service configurations via a training dataset that includes historical selections of network service configurations by a plurality of subscribers for which service condition faults were detected.

16. The system of claim 13, wherein the particular second network service configuration is implemented for a particular time period that corresponds to the particular recurrence category, and wherein the instructions further cause the system to:
    implement the first network service configuration subsequent to the particular time period.

17. The system of claim 13, wherein the instructions further cause the system to:
    rank, via the ML model, the plurality of second network service configurations based on a relevance to the subscriber; and
    cause display of the plurality of second network service configurations at subscriber devices associated with the subscriber.

18. The system of claim 13, wherein the user selection occurs at a particular subscriber device that is associated with a particular permission level that authorizes a user of the particular subscriber device to modify subscriber information for the subscriber.

19. The system of claim 13, wherein the service condition fault is detected based on an event being published to a network event queue that is monitored by the system, the event indicating the service condition fault.

20. The system of claim 13, wherein detecting the service condition fault includes using a fault prediction model to predict the service condition fault, and wherein the particular second network service configuration is implemented at the wireless telecommunication network prior to when the service condition fault is predicted to occur.

* * * * *